US008678543B2

(12) United States Patent
Zhou et al.

(10) Patent No.: US 8,678,543 B2
(45) Date of Patent: Mar. 25, 2014

(54) COMPOSITION AND PRINT MEDIUM

(75) Inventors: Xiaoqi Zhou, San Diego, CA (US); Hai Quang Tran, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/124,456

(22) PCT Filed: Oct. 16, 2008

(86) PCT No.: PCT/US2008/080073
§ 371 (c)(1),
(2), (4) Date: Apr. 15, 2011

(87) PCT Pub. No.: WO2010/044795
PCT Pub. Date: Apr. 22, 2010

(65) Prior Publication Data

US 2011/0205287 A1 Aug. 25, 2011

(51) Int. Cl.
*B41J 2/015* (2006.01)
*B41J 29/38* (2006.01)
*G01D 11/00* (2006.01)

(52) U.S. Cl.
USPC ................................ 347/20; 347/16; 347/100

(58) Field of Classification Search
USPC ..................................... 347/6–7, 16, 20, 100
See application file for complete search history.

(56) References Cited

U.S. PATENT DOCUMENTS

| | | | | |
|---|---|---|---|---|
| 5,620,793 A * | 4/1997 | Suzuki et al. | .............. | 428/32.18 |
| 6,861,113 B2 * | 3/2005 | Kranz et al. | ............... | 428/32.22 |
| 2003/0118793 A1 * | 6/2003 | MacMillan | .................. | 428/195 |
| 2004/0121093 A1 * | 6/2004 | Ogino et al. | ................. | 428/32.1 |
| 2007/0125267 A1 * | 6/2007 | Song et al. | ................. | 106/214.1 |
| 2008/0081203 A1 | 4/2008 | Knight et al. | | |

FOREIGN PATENT DOCUMENTS

| | | |
|---|---|---|
| JP | 2000071606 A | 3/2000 |
| JP | 2000280613 A | 10/2000 |
| WO | 2007053681 A1 | 5/2007 |

OTHER PUBLICATIONS

Supplemental European Search Report (SESR) and Opinion from the European Patent Office (EPO) for counterpart PCT patent application PCT/US2008080073 in EPO (App. No. EP 08825526), 6 pages, dated Aug. 8, 2012.
International Search Report (ISR) and Written Opinion of the International Searching Authority (ISA) mailed May 29, 2009 from ISA/KR for counterpart PCT Application No. PCT/US2008/080073 (12 pages).

* cited by examiner

*Primary Examiner* — Jason Uhlenhake

(57) ABSTRACT

One or more surface treatment compositions and print mediums are disclosed. The surface treatment compositions may comprise at least one surface sizing agent and at least one monovalent and at least one, multivalent metallic salt. Also disclosed are methods for the production of the surface treatment composition and print media with the composition.

15 Claims, 2 Drawing Sheets

COMPOSITION AND PRINT MEDIUM

BACKGROUND

The development of digital printing technology, such as thermal inkjet printing, has made the use of computer printers less expensive and thus, widely available to all computer users. Currently available printers are able to produce full-color and highly detailed images. The widespread use of digital printing technology in residential and commercial environments has created challenges with respect to traditional printing media on which the images are formed, particularly when pigmented ink is utilized. Current print media, when used in combination with pigment inks, often suffer from poor black and color optical density, ink bleeding and smearing, extended dry times, and image strike through.

In order to overcome these problems, divalent metal salts, e.g., calcium chloride, have recently been added, as an ink fixative, to surface sizing processing of the print media to achieve improved media properties. However, to achieve such effects, the calcium chloride needs to be used in a large concentration, e.g., from 6 to 12 kg salt per ton (T) of paper. Such a high loading of chloride-containing compounds promotes drastic corrosion of the paper milling equipment used to produce the print media, and significantly reduces the life span of the salt-contacting parts of the paper manufacturing equipment, including, for example, sizing rolls.

Another drawback commonly associated with the use of calcium chloride salt arises from its exothermic dissolution in water. A significant amount of heat is produced when large batches of calcium chloride salt solution are prepared, as is customary in commercial paper manufacturing processes. Solution temperatures can easily reach over 90° C. or more. The chloride-containing vapors from such a heated solution can cause serious health and safety issues to workers involved with the mixing process.

Further, calcium chloride is very moisture-absorbent. The use of this type of salt can easily change the stiffness of the paper due to absorption of water into the paper. This inevitably causes some issues related to the runnability of the media in the print. These issues can cause, for example, paper jamming and/or multi-picking of the sheets from a paper tray.

In view of the foregoing, there is a need in the art for a paper or print medium having improved print quality and print properties when printed using pigment ink.

DETAILED DESCRIPTION

Figure 1:
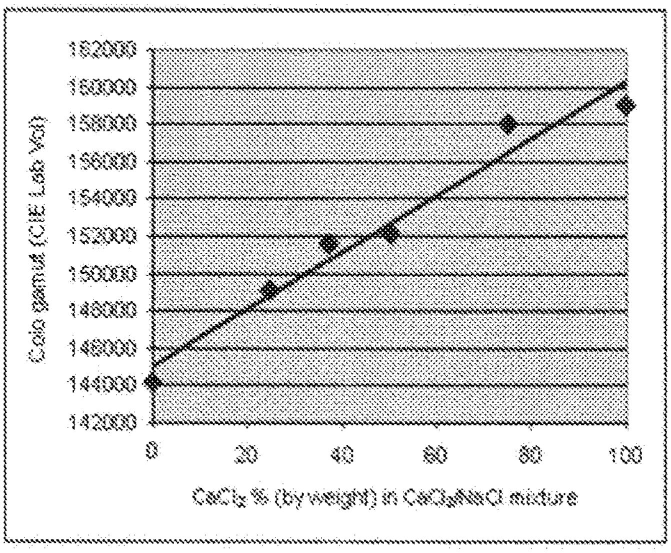
FIG. 1 illustrates a graph of color gamut (CIE L*a*b* volume) versus amount (in percent by weight) of calcium chloride in a mixture with sodium chloride for print media samples, according to an example consistent with the principles described herein.

In the following description, for purposes of explanation, numerous specific details are set forth in order to provide a thorough understanding of one or more aspects of the disclosure herein. It may be evident, however, that one or more aspects of the disclosure herein may be practiced with a lesser degree of these specific details.

The disclosure relates to a surface treatment composition and a print medium containing the composition therein. The print medium has an improved optical density and color gamut, more rapid dry time, and decreased bleed. Here and elsewhere in the specification and claims, the ranges and ratio limits may be combined.

The phrase "effective amount," as, used herein, refers to the minimal amount of a substance and/or agent, which is sufficient to achieve a desired and/or required effect. For example, an effective amount of a "salt mixture" is the minimum amount required in order to create a surface treatment composition haying the desired properties associated therewith. The word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application term or is intended to mean an inclusive "or" rather than an exclusive "or". In addition, the articles "a" and "an" as used in this application and the appended claims may generally be construed to mean "one or more" unless specified otherwise or clear from context toy be directed to a singular form.

In one embodiment, the surface treatment composition is applied to a substrate or print medium. "Substrate", "paper base", "base paper stock" or "print medium" includes any material that can be treated, in accordance with an embodiment of the disclosure herein, including but not limited to cellulosic paper, film base substrates, polymeric substrates, conventional paper substrates, woodfree paper, wood containing paper, clay coated paper, glassine, paperboard, photobase substrates, and the like. Further, pre-coated substrates, such as polymeric coated substrates or swellable media, can also be coated in embodiments of the invention.

In one embodiment, the paper base or substrate comprises any suitable type of cellulose fiber, or combination of fibers known for use in paper making. For example, the substrate can be made from pulp derived from hardwood fibers, softwood fibers, or a combination of hardwood and softwood fibers prepared for use in papermaking fiber obtained by known digestion, refining, and bleaching operations, such as those that are customarily employed in mechanical, thermomechanical, chemical and semi-chemical pulping or other well-known pulping processes. For some applications, all or a portion of the pulp fibers are obtained from non-woody herbaceous plants such as kenaf, hemp, jute, flax, sisal and abaca, for example. Either bleached or unbleached pulp fiber may be utilized in preparing a suitable paper base for the print media. Recycled pulp fibers are also suitable for use. In certain applications, the paper base is made by combining 30% to about 100% by weight hardwood fibers and from about 0% to about 70% by weight softwood fibers.

The substrate may also include other conventional additives such as, for example, fillers, retention aids, wet strength resins (internal sizing) and dry strength resins (surface sizing) which may be added to the substrate during the paper making process. Among the fillers that may be used are inorganic and organic fillers such as, by way of example, minerals such as calcium carbonate, barium sulfate, titanium dioxide, calcium silicates, magnesium carbonate, barium carbonate, zinc oxide, silicon oxide, amorphous silica, aluminum hydroxide, calcium hydroxide, magnesium hydroxide, zinc hydroxide, mica, kaolin and talc, and polymeric particles such as, polystyrene, polymethylmethacrylate latexes and their copolymers. Other conventional additives include, but are not restricted to, alum, pigments and dyes for coloring the substrate to the desirable color hue. In one embodiment, the substrate will comprise from about 5% to about 35% by weight of filler.

An exemplary inkjet printing media comprises a substrate such as a cellulose paper and a surface treatment composition applied on a single side or on both sides of the substrate. The cellulose paper has a basis weight ranging from about 35-250 $g/m^2$, with about 5 to 35% by weight of filler. The base paper contains wood pulp such as groundwood pulp, thermomechanical pulp and chemo-thermomechanical pulp, and additionally or alternatively, contains wood-free pulp.

For most applications at least one wet strength resin or sizing agent can be added to the pulp suspension prior to conversion to a paper web or substrate to provide internal sizing of the substrate. The internal sizing treatment helps to develop in the resulting substrate a resistance to liquids during use. During further stages of the paper making processing, the internal sizing also prevents any subsequently-applied surface sizing from soaking into the finished sheet, thereby allowing the surface sizing to remain on the surface where it has maximum effectiveness. Internal sizing agents that are suitably used for this purpose include any of those commonly used at the wet end of a paper manufacturing machine, for example, rosin; rosin precipitated with alum ($Al_2(SO_4)_3$); abietic acid and abietic acid homologues such as neoabietic acid and levopimaric acid; stearic acid and stearic-acid derivatives; ammonium zirconium carbonate; silicone and silicone-containing compounds; fluorochemicals of the general structure $CF_3(CF_2)_nR$, wherein R is anionic, cationic or another functional group; starch and starch derivatives; methyl cellulose; carboxymethylcellulose (CMC); polyvinyl alcohol; alginates; waxes; wax emulsions; alkylketene dimer (AKD); alkenyl ketene dimer emulsion (AnKD); alkyl succinic anhydride (ASA); emulsions of ASA or AKD with cationic starch; ASA incorporating alum; and other known internal sizing agents and combinations of those. The internal sizing agents are generally used at concentration levels known to those who practice the art of paper making. For instance, in one embodiment, the amount of internal sizing agent is in the range of about 0.3 kg/T (kilograms per ton) of base paper stock to 20 kg/T.

The degree of internal sizing can be characterized in terms of how much the paper stock absorbs the aqueous solvents and how quickly the aqueous solvent penetrates through the paper stock. The Cobb test is used for measurement of liquid absorption, where one surface of the paper sample is exposed under a given hydrostatic head to water under a specified time, i.e., 60 seconds with the circular area of the sample being 100 $cm^2$. After a fixed time of 60 seconds, the water is decanted and excess water is blotted off. The water absorbed in terms of gram per square meter ($g/m^2$) is used to evaluate absorption capability. To obtain exemplary printing results, the internal sizing agents should be applied in an amount that yields a Cobb value, in one embodiment, in the range from about 20 to about 50 $g/m^2$. In another embodiment, the internal sizing agent can be applied in an amount to yield a Cobb value in the range from about 25 to about 40 $g/m^2$. The penetration property of the paper sample is determined by the ink absorption rate as measured by Bristow Wheel Dynamic Sorption Tester ranges from 10 $ml/m^2$/second to 40 $ml/m^2$/second, with a wheel speed of 1.25 mm/sec.

Other polymeric compounds can also be used in wet end of paper making, such as various starches, polyacrylamides, urea resins, melamine resins, epoxy resins, polyamide resins, polyamides, polyamine resins, polyamines, polyethyleneimine, vegetable gums, polyvinyl alcohols, latexes, polyethylene oxide, hydrophilic crosslinked polymer particle dispersions and derivatives or modified products thereof.

Alum is a central chemical for retention aid and drainage aids. In one embodiment the alum additives used include aluminum sulfate, aluminum chloride, sodium aluminate; basic aluminum compounds such as basic aluminum chloride and basic aluminum polyhydroxide; water-soluble aluminum compounds such as colloidal alumina readily soluble in water; as well as polyvalent metal compounds such as ferrous sulfate and ferric sulfate; colloidal silica, etc.

In addition, internal paper additives such as dyes; fluorescent whitening agents, pH adjusting materials, antifoaming agents, pitch control agents, slime control agents or the like can also be contained as appropriate depending on the purpose.

The surface treatment composition, in one embodiment, comprises at least one surface, sizing agent. The surface sizing agents, in one embodiment, include one or more starches and starch derivatives; carboxymethylcellulose (CMC); methyl cellulose; alginates; waxes; wax emulsions; alkylketene dimer (AKD); alkyl succinic anhydride (ASA); alkenyl ketene dimer emulsion (AnKD); emulsions of ASA or AKD with cationic starch; ASA incorporating alum; and/or one or more water-soluble or water-dispersible polymeric materials. Water-soluble and water-dispersible polymeric materials include, for example, polyvinyl alcohols such as polyvinyl alcohols, completely saponified polyvinyl alcohols, partially saponified polyvinyl alcohols, carboxyl-modified polyvinyl alcohols, silanol-modified polyvinyl alcohols, cationically modified polyvinyl alcohols, terminally alkylated polyvinyl alcohols; acrylamide polymers, acrylic polymers or copolymers, vinyl acetate latex, polyesters, vinylidene chloride latex, styrene-butadiene, acrylonitrile-butadiene copolymers, styrene acrylic copolymers; gelatin; and cellulose and cellulose derivatives such as carboxymethyl cellulose, hydroxyethyl cellulose, methyl cellulose. These are used alone or in combinations of two or more.

In one embodiment, a starch is used as the surface sizing agent. Examples of suitable starches are corn starch, tapioca starch, wheat starch, rice starch, sago starch and potato starch. These starch species may be unmodified starch, enzyme modified starch, thermal and thermal-chemical modified starch and chemical modified starch. Examples of chemically-modified starch are converted starches such as acid fluidity starches, oxidized starches and pyrodextrins; derivatized starches such as hydroxyalkylated starches, cyanoethylated starch, cationic starch ethers, anionic starches, starch esters, starch grafts, and hydrophobic starches. The surface sizing agents are generally used at concentration levels customary in the art of paper making. In another embodiment, the surface sizing agent includes both a starch and, optionally, a synthetic sizing agent. For example, the amount of starch applied on the substrate surface comprises, in one embodiment, from about 2 to about 25 kg/T of paper substrate, and the amount of synthetic surface sizing agent comprises, in one embodiment, up to about 6 kg/T of paper substrate.

In addition to a surface sizing agent, the surface treatment composition includes a salt mixture having at least two metallic salts. In one embodiment, the mixed salts comprise at least one monovalent and at least one multivalent metallic salt. In one embodiment, the mixed salts comprise one or more of water-soluble monovalent or multivalent salts. Suitable cation species can include one or more of Group I metals, Group II metals, Group III metals or transition metals, for example, sodium, potassium, calcium, copper, nickel, zinc, magnesium, barium, iron, aluminum and chromium ions. Anion species can include one or more of chloride, iodide, bromide, nitrate, sulfate, sulfite, phosphate, chlorate, and acetate. In one embodiment the salt mixture comprises a multivalent metallic salt of a Group II or a Group III metal and a monovalent metallic salt from a Group I metal. In one embodiment, the mixed salt comprises magnesium chloride and sodium chloride. Both magnesium chloride and sodium chloride show a lower relative, corrosion rate than calcium chloride (the relative corrosion rate measured by National Association of Corrosion Engineers Standard TM-01-69 for NaCl, $MgCl_2$ and $CaCl_2$ are 100, 80, 121 respectively, where the higher the number, the stronger in corrosion tendency). In another embodiment, the mixed salt comprises calcium chloride and sodium chloride. In a further embodiment, the mixed salt comprises aluminum chloride and sodium chloride. It was found that each of the mixed salt solutions exhibited lower temperature increases during salt solution preparation, as well as decreased corrosion to the machine parts contacting the salt solution for extended time periods, as compared with single calcium chloride salt solutions at the same concentration and exposure time.

The surface treatment composition contains an "effective amount" of the soluble metal salt mixture in contact with at least one surface of the substrate to provide improved printing quality of the substrate including, for example, ink dry times, and color and black optical density. In one embodiment, the surface treatment composition may contain from about 1 kg up to about 15 kg of the salt mixture per ton of paper substrate. The relative weight percentage of each type of metallic salt in the salt mixture comprises, in one embodiment, at least about 20 wt %, and in one embodiment, from about 30 wt % up to about 70 wt % of the salt mixture.

The print medium of the invention can be prepared using known conventional techniques. For example, the metal salt mixture may be admixed with one or more starches, and one or more optional components can be dissolved or dispersed in an appropriate liquid medium, preferably water, and can be applied to the substrate by any suitable technique, such as a size press treatment, dip coating, reverse roll coating, extrusion coating or the like.

The surface treatment composition may be applied to the substrate with conventional size press equipment, for example, a film size press or a puddle-size press, having vertical, horizontal or inclined rollers. The film size press may include a metering system, for example, gate-roll metering, blade metering, Meyer rod metering or slot metering. In one embodiment, size press with a short dwell blade metering system is utilized. The coating speed at which the surface treatment composition is applied to the substrate is not specifically limited, but will generally be from about 600 to about 1200 meters per minute (m/min) for office print papers. By adopting a higher coating speed, the surface treatment composition remains near the surface to increase printability improving effects and improve surface smoothness.

In dip treating, a web of the substrate material to which the surface treatment composition is to be applied is transported below the surface of the composition by a single roll in such a manner that the exposed site is saturated, followed by removal of any excess treating mixture by squeeze rolls and drying at 120-200° C. in an air dryer. The method of surface treating the substrate using a coater results in a continuous sheet of substrate with the surface treatment composition applied, in one embodiment, first to one side and then to the second side of this substrate. In another embodiment, the composition is applied to the substrate such that both sides of the substrate are coated simultaneously, where two coating stations are provided, with one on each side. The substrate can also be treated by a slot extrusion process, wherein a flat die is situated with the die lips in close proximity to the web of substrate to be treated, resulting in a continuous film of the composition evenly distributed across one surface of the sheet.

Regardless of the method of application of the surface treatment composition to the substrate the composition will be applied to the substrate for a total coating weight, in one embodiment, of from about 0.6 $g/m^2$ to about 8 $g/m^2$ per substrate side. In another embodiment, the total coating weight may be from about 0.8 $g/m^2$ to about 5 $g/m^2$ per substrate side. The total mixed salts in the composition applied to the substrate may be, in one embodiment, from about 2 kg to about 15 kg/T of the substrate, and in one embodiment from about 4 kg to about 10 kg/T of the substrate. To achieve exemplary printing results, the total content of mixed salt is at least about 0.16 $g/m^2$ per substrate side.

Following application of the surface treatment composition onto the substrate, the substrate may be subjected to further processing steps. For example, the substrate may be dried by passing through an infrared dryer or hot air dryer, or a combination of both. Additionally, the substrate may be calendared to further improve gloss or smoothness and other properties of the papers. For example, the substrate is calendared by passing the substrate through a nip formed by a calendar roll at room temperature.

The print medium may be printed by generating images on a surface of the medium using conventional printing processes and apparatus as for example laserjet, inkjet, offset and flexo printing processes and apparatus. The print medium, in one embodiment, is printed with inkjet printing processes equipped with pigmented ink and apparatus such as, for example, desk top ink jet printing and high speed commercial ink jet web printing. When ink drops are ejected on the media containing the metallic salts mixture, the salts crash out the pigment dispersions from ink solutions, and cations interact with anionic particles of colorants so that the pigmented colorant stays on the outermost surface layer of the media.

The resulting treated printing media are suitably employed with any inkjet printer using pigmented inks for any drop on demand or continuous ink jet technology, such as thermal ink-jet or piezoelectric ink-jet technology. Pigmented ink-jet inks are well known in the art, and typically contain a liquid vehicle, pigment colorants, and additional components including one or more dyes, humectants, detergents, polymers, buffers, preservatives, and other components. A pigment or any number of pigment blends may be provided in the ink-jet ink formulation to impart color to the resulting ink. The pigment may be any number of desired pigments dispersed throughout the resulting ink-jet ink.

The following examples illustrate various formulations for preparing the compositions of the invention. The following examples should not be considered as limitations of the disclosure herein, but are merely provided to teach how to make the compositions and print medium based upon current experimental data.

EXAMPLES

Example 1

A series of ink-jet printing media were prepared using the following procedure:

(A) The paper substrates used in this experiment were made on a paper machine from a fiber furnish consisting of 30% softwood and 50% hardwood fibers and 12% precipitated calcium carbonate with alkenyl succinic anhydride (ASA) internal size. The basis weight of the substrate paper was about 75 $g/m^2$.

(B) The surface sizing composition was prepared in the laboratory using a 55 gal jacketed stainless steel processing vessel (A&B Processing System Corp, Stratford, Wis.). A. Lighthin mixer (Lighthin Ltd, Rochester N.Y.) with gear ratio 5:1 and a speed of 1500 rpm was used to mix the formulation. A chemically-modified starch was first pre-cooked at 95° C. for 2 hrs and cooled to room temperature. The pre-cooked starch was added to the mixing container, followed by, the addition of water, and then the other additives such as synthetic sizing agent; fluorescent whitening agents (FWA) and pH buffer. The water soluble metallic salts were pre-dissolved and filtered, and then mixed together with the starch mixture at 500-1000 rpm.

A typical formulation of the surface treatment composition may include (as a non-limiting example):

Cationic Starch: 12.5 kg/T of paper substrate;

Calcium chloride and sodium chloride mixed at different ratio, and the total usage of salt mixture was: 7.3 kg/T of paper substrate;

Fluorescent whitening agents (FWA): about 7.5 kg/T of paper substrate;

Synthetic surface sizing agent: 4.0 kg/T of paper substrate.

(C) A print medium was prepared using a size press by applying the resulting surface sizing composition either by hand drawdown using a Mayer rod, or a continuous lab sizing press with a rod for metering. By controlling the formulation solids, viscosity, rod size, and machine running speed, a pick-up weight of about 0.5 to 2.0 $g/m^2$ per side was achieved. The treated sheets were dried in a hot air oven at a temperature of about 80-200° C. for a period of about 10-20 min.

Example 2

The print media samples prepared as described in Example 1 were tested in order to show the differences in terms of color gamut, black optical density and line raggedness between samples with different mixed salt loading. The samples were printed using HP PhotoSmart® Pro B9180 with pigmented black and color inks, manufactured by Hewlett-Packard Co. The color gamut of each printed image was recorded, and the results are provided as a bar graph in FIG. 1, with the y axis gauging increasing amounts of CIE L*a*b* volume, a measure of color gamut. The color gamut measurements were carried out on squares of primary color (cyan, magenta, and yellow) and secondary colors (red, green, and blue) plus white (un-imaged sheets) and black colors. L*a*b* values were obtained from the measurement and thereafter were used to calculate the 8-point color gamut, where the higher value of color gamut indicates that the prints showed richer or more saturated colors.

As shown in FIG. 1, the color gamut measurements indicated an increase in terms of color gamut in the samples with calcium chloride at a fixed mixed salt of 7.3 Kg/T of dry paper stock. These results indicate that calcium chloride has a stronger effect than sodium chloride in promoting the color gamut. When the weight percentage of calcium chloride, was reduced to 50%, or lower, the color gamut value was still greater than most commercial office printing papers, which normally exhibit the color gamut of 100,000 to 140,000 under the same printing conditions.

Figure 2:
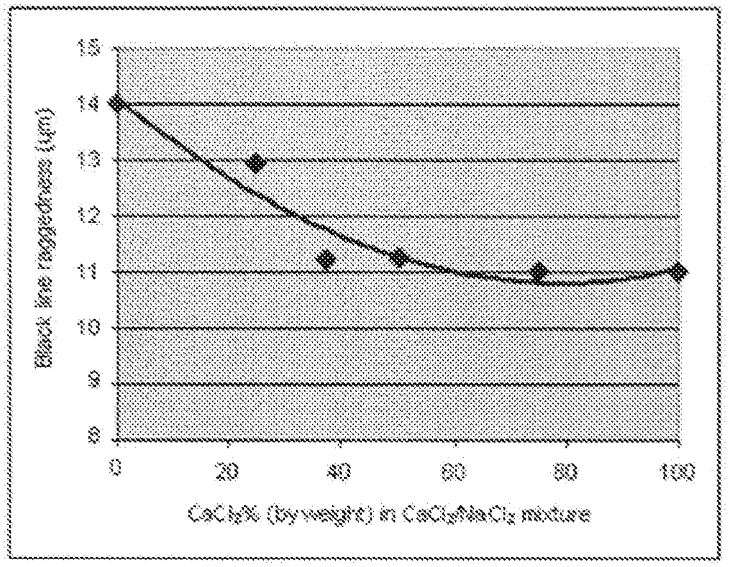
FIG. 2 illustrates a graph of black line raggedness versus amount (in percent by weight) of calcium chloride in a mixture with sodium chloride for print media samples, according to an example consistent with the principles described herein.

Line raggedness is the average of the leading edge and trailing edge raggedness and measures the appearance of geometric distortion of an edge from its ideal position. In this evaluation, media samples were imaged as black lines using HP PhotoSmart® Pro B9180 with pigmented black and color inks, manufactured by Hewlett-Packard Co. The samples were then allowed to air dry. The edge acuity of the black-to-yellow bleed was measured with a QEA Personal Image Analysis System (Quality Engineering Associates, Burlington, Mass.). Smaller values are indicative of better edge quality of the printed image. As shown in FIG. 2, the y axis gauges increasing amounts of line raggedness as measured in micrometers. The samples containing different mixing ratios of calcium chloride and sodium chloride at fixed total loading of 7.3 kg/T of dry paper stock clearly show less line raggedness (lower line raggedness value) than the commercial paper which normally post a line raggedness value of 16-25 microns under the same printing conditions. This result implies that media containing the mixed salt composition will produce a print-out of a crisp image. It was found that when weight percentage of calcium chloride was over 40,% the line raggedness was no longer reduced with an increase in the calcium chloride amount. A reduction in calcium chloride usage does not sacrifice the image quality, but reduces the possibility of those drawbacks associated with calcium chloride use, such as corrosion and pollution to the environment.

Figure 3:
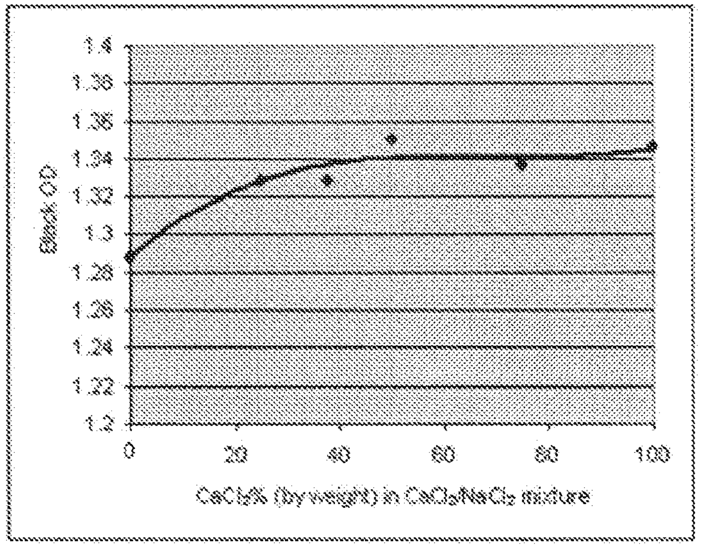
FIG. 3 illustrates a graph of black optical density (KOD) versus amount (in percent by weight) of calcium chloride in a mixture with sodium chloride for print media samples, according to an example consistent with the principles described herein.

The black optical density (KOD) is one of most important attributes for office printing where most of documents produced are in black and white. It is desirable to have a print-out with KOD value similar to those produced from a LaserJet printer, for example, a KOD value around 1.2 to 1.3. In this invention, measurements of KOD were carried out on the same samples prepared as described in Example 1, using an X-Rite densitometer to measure the blackness of the area filled. The results are provided in FIG. 3, with the y axis gauging increasing amounts of KOD. Regardless of the ratio of calcium chloride and sodium chloride in the surface treatment composition, the printing media treated with the surface treatment composition salt had a significant improvement in black optical density over most, commercial office printing media, producing a bolder black image. The average KOD value of most commercial office printing media is 0.7 to 1.0, where as the media containing the surface treatment composition had a KOD range from 1.28 to 1.35. Similar to line raggedness, an increase of calcium chloride weight percentage, up to 20%, promoted the KOD, and KOD was less dependent on the calcium chloride percentage. This result provides the possibility to limit the drawback from calcium chloride.

Example 3

In this example, the ink dry time of the samples of the surface treated printing media as made by the methods described in Example 1, as well as a commercial office printing media were measured. Ink dry time refers to the time it takes for the ink to dry such that it will not smear or transfer to other surfaces. The ink dry time is determined by testing the ink amount transferred to another sheet at a constant time. A series of black squares were printed on the media sheets described above using an HP PhotoSmart® Pro B9180 equipped with black pigmented ink, manufactured by Hewlett-Packard Co. After waiting 10 seconds following printing, the samples were covered with the same type of paper and rolled with a 4.5 lb rubber hand roller, model HR-100, manufactured by ChemInstruments, Inc. The samples were then allowed to air dry. The optical densities ($OD_t$) of the images transferred on the cover sheets as well as the optical density of the reference (original non-transferred, $OD_r$) were measured with an X-Rite densitometer to determine the density before and after rolling. An unprinted area was also measured to obtain a value for the paper background, $OD_b$. The percent of ink transferred (% IT) for the various papers was then calculated using the following equation:

$$\% IT=1-(OD_r-(OD_t-OD_b))/OD_r \times 100\%$$

The higher the value of % IT, the more ink transferred, which is an indication of longer ink dry time and poor fixing of ink to media. In exemplary test results, the percentage of ink transferred in the commercial print media, which was used as the control and contained only a starch type surface composition with no salt mixture, had the ink transferring in the range of 15-30%, while the transferring was reduced to 2-10% with use of ink-jet inks printed on media containing the surface treatment composition of the invention.

Example 4

A series of ink-jet printing media were prepared using the following procedure:

(A) Base stock used is the same as descried in Example 1.

(B) The surface sizing composition was prepared in the laboratory using a 55 gal jacketed stainless steel processing vessel (A&B Processing System Corp, Stratford, Wis.). A Lighthin mixer (Lighthin Ltd, Rochester N.Y.) with gear ratio 5:1 and a speed of 1500 rpm was used to mix the formulation. A chemically-modified starch was first pre-cooked at 95° C. for 2 hrs and cooled to room temperature. The pre-cooked starch was added to the mixing container, followed by the addition of water, and then the other additives such as synthetic sizing agent; fluorescent whitening agents (RWA) and pH buffer. The water soluble metallic salts, were pre-dissolved and filtered, and then mixed together with the starch mixture at 500-1000 rpm.

A typical formulation of the surface treatment composition may include (as a non-limiting example):

Cationic-Starch: 12.5 kg/T of paper substrate;

Magnesium chloride and sodium chloride mixed at a ratio of 60:40 by weight, and the total usage of salt mixture was: 7.5 kg/T of paper substrate;

Fluorescent Whitening agents (FWA) about 7.5 kg/T of paper substrate;

Synthetic surface sizing agent: 4.0 kg/T of paper substrate.

(C) A print medium was prepared using a size press by applying the resulting surface sizing composition either by hand drawdown using a Mayer sod, or a continuous lab sizing press with a rod for metering. By controlling the formulation solids, rod size or nip pressure, and machine running speed, a pick-up weight of about 0.5 to 2.0 g/m$^2$ per side was achieved. The treated sheets were dried in a hot air oven at a temperature of about 60-200° C. for a period of about 10-20 min.

The test methods used for printing tests and for image quality characterization is the same as exhibited in example 2 and example 3. The results is summarized in table 1.

TABLE 1

| Sample | Black OD | Color gamut | Line Raggedness (micro) | Dry time (by % of ink transfer) |
|---|---|---|---|---|
| Ex. 4 (With magnesium chloride/sodium chloride salts) | 1.38 | 151200 | 7.24 | 6.4% |
| Control (Commerical office printing paper, 75 gsm) | 0.96 | 102500 | 21.72 | 26.5% |

As can been seen in Table 1, the samples having a surface treatment composition containing the magnesium chloride/sodium chloride salt mixture have improved performance in all image quality items tested over the commercial office printing media. The surface treatment composition provides the further advantage of a decreased occurrence of corrosion of machine parts exposed to the salt mixture after extended operation. Such advantage is even more predominant when compared with the use of calcium chloride only.

Although the disclosure has been shown and described with respect to one or more embodiments and/or implementations, equivalent alterations and/or modifications will occur to others skilled in the art based upon a reading and understanding of this specification. The disclosure is intended to include all such modifications and alterations and is limited only by the scope of the following claims. In addition, while a particular feature may have been disclosed with respect to only one of several embodiments and/or implementations, such feature may be combined with one or more other features of the other embodiments and/or implementations as may be desired and/or advantageous for any given or particular application. Furthermore, to the extent that the terms "includes", "having", "has", "With", or variants thereof are used in either the detailed description or the claims, such terms are intended to be inclusive in a manner similar to the term "comprising."

What is claimed is:

1. A print medium comprising:

a substrate; and a surface treatment composition applied onto a surface of the substrate, the composition comprising at least one surface sizing agent and a metallic salt mixture of at least one monovalent and at least one multivalent metallic salt, the relative weight percentage of each type of metallic salt at least about 20% by weight in the salt mixture.

2. The print medium of claim 1, the substrate comprising one or more of a cellulosic paper, a film base, a polymeric substrate, a conventional paper, a wood-free paper, a wood-containing paper, a clay coated paper, glassine, paperboard, a photobase, or a pre-coated substrate.

3. The print medium of claim 2, the substrate having a basis weight from about 35 g/m$^2$ to about 250 g/m$^2$ and a filler content of about 5% to about 35% by weight of filler.

4. The print medium of claim 1, the surface sizing agent comprising one or more starches and starch derivatives and/or one or more water-soluble or water-dispersible polymeric materials.

5. The print medium of claim 1, the total mixed salt content in the print medium comprising at least about 0.16 g/m$^2$ per substrate side.

6. The print medium of claim 5, the monovalent salt comprising a Group I metal and the multivalent salt comprising a Group II or a Group III metal.

7. The print medium of claim 6, the monovalent salt comprising sodium chloride and the multivalent salt comprising aluminum chloride, magnesium chloride, or calcium chloride.

8. The print medium of claim 1, further comprising an internal sizing agent.

9. The print medium of claim 8, the internal sizing agent applied in an amount to yield a Cobb value of from about 20 to about 50 g/m$^2$.

10. A surface treatment composition comprising:

at least one surface sizing agent; and a salt mixture comprising at least one monovalent and at least one multivalent metallic salt, the relative weight percentage of each type of metallic salt at least about 20% by weight in the salt mixture.

11. The composition of claim 10, the surface sizing agent comprising one or more of starches and starch derivatives and/or one or more water-soluble or water-dispersible polymeric materials.

12. The composition of claim 11, the monovalent salt comprising a Group I metal and the multivalent salt comprising a Group II or a Group III metal.

13. The composition of claim 11, the surface sizing agent comprising a starch in the amount of about 2 to about 25 kg/T of a paper substrate and a synthetic sizing agent in an amount up to about 6 kg/T of a paper substrate.

14. A method of forming a pigmented inkjet image on a surface treated substrate comprising:

applying the aqueous surface treatment composition of claim 10 to at least one surface of the substrate;

jetting a pigment-based ink onto the surface-treated substrate to form an image thereon.

15. A method of making a print medium comprising:

mixing at least one surface sizing agent and a salt mixture comprising at least one monovalent and at least one multivalent metallic salt to form a surface treatment composition, the relative weight percentage of each type of metallic salt at least about 20% by weight in the salt mixture; and applying the surface treatment composition onto a surface of a substrate.

* * * * *